United States Patent Office 2,863,882
Patented Dec. 9, 1958

2,863,882

PRODUCING AND RECOVERING TERPENIC OXIDATION PRODUCTS

Joseph P. Bain, Albert B. Booth, and Eugene A. Klein, Jacksonville, Fla., assignors to The Glidden Company, Cleveland, Ohio, a corporation of Ohio No Drawing. Application September 8, 1953
Serial No. 379,070

29 Claims. (Cl. 260—348.5)

The present invention relates to producing and recovering oxygenated terpenic materials by novel and improved methods.

It is known that certain terpenes and their derivatives are oxidized by contacting them with oxygen or with a gas rich in oxygen such as air. Thus verbenol and verbenone are known to be isolable from such an oxidation of alpha pinene followed by steam distillation of the oxidized product and then separating the individual compounds by suitable chemical and physical processes. Further, by such processes and procedures pinocarveol, pinocarvone and myrtenol have been isolated from oxidizing beta pinene and carveol and carvone have been isolated from oxidizing limonene. Other unsaturated terpenes and terpenic compounds such as menthene, terpineol and terpinolene have been so oxidized and the resulting oxidation mixtures have been worked up to provide various oxidation products depending upon the raw material employed.

In the prior art there is little disclosed as to the yields of individual oxidation products which may be isolated by the procedures employed but study of the prior art suggests that yields are not good and considerable acidic non-volatile oils and tars are produced. It is further suggested by the prior art that such oxidation products as are obtained are difficulty purifiable. It is therefore not to be understood from the prior art that feasible processes and procedures are known for economic production of such oxidized terpenic materials.

We have found that compounds other than those described in the recorded prior art are recoverable from terpene oxidation mixtures if novel and improved treatments of such oxidation mixtures are employed. We have found further that by use of such improved treatments the oxidized terpenic moiety is more easily and more economically worked up to secure purified materials. We have further found that by use of our processes the yields of oxidized terpene compounds are good and that formation of high boiling and non-distillable acidic tars and other by-products of low economic value is substantially reduced. Our treatment therefore provides a simple and economic route to recovery of valuable terpene oxidation products.

It is accordingly an object of the present invention to provide an improved process for producing oxygenated terpenic products.

Another object is to provide an improved process for treating the mixture resulting from the air or gaseous oxygen oxidation of terpenes and unsaturated terpenic compounds.

Another object is to provide an improved process for producing terpenic oxides.

Another object is to provide an improved process for producing acid-sensitive terpenic oxidation products.

Another object is to provide a novel method for decomposing terpenic peroxides for the purpose of producing volatile oxygenated terpenic materials.

Another object is to provide an improved process for producing terpenic acids.

Another object is to provide an improved process for producing an easily separable oxidized terpenic mixture.

Another object is to provide an improved process for producing allylomeric alcohols.

The principles and objectives of our treatment disclosed here stems from our recognition that terpene oxidation products initially formed, and which consist of peroxides and oxides etc. and whose exact nature is not well understood, are very sensitive to various influences which can lead to the difficulties experienced by the prior art in working up satisfactorily such terpenic oxidation products to obtain economically products which possess much utility. The prior art is therefore confined largely to academic studies which have shown that certain compounds can be produced from oxygen or air oxidation of terpenes but prior art procedures have been so inadequate that previous workers have been unable to recognize the true and full nature of the terpene oxidation mixture or that such oxidation mixtures can be processed to recover novel and valuable materials which cannot be obtained in the course of improper treatments and separations.

For example, it is shown in copending application Ser. No. 352,291, filed April 30, 1953, that alpha pinene can be oxidized to a peroxide value of say, 1000 to 2000, the oxidation mixture then subjected to a reduction as by means of excess aqueous sodium sulfite preferably maintaining substantial alkalinity in the reduction step, and then separating the compounds, chiefly of empirical formula $C_{10}H_{16}O$, suitably by fractional vacuum distillation. The compounds known to be obtained from α-pinene air oxidation by the prior art procedures, verbenol and verbenone are present in the fractions of the recovered oxidation products produced by means of the alkaline sulfite reduction, but half or more of the total volatile products obtained were hitherto not known to be recoverable from pinene oxidation products. These products, not recoverable from processing pinene contacted with air or oxygen, include pinene oxide and cis- and trans-3-pinene-2-ol, and significantly, they are products very sensitive to conditions which obtain in prior art procedures, particularly conditions present in various stages of prior art procedures. Thus in copending application Ser. No. 361,420, filed June 12, 1953, now Patent No. 2,815,378, it is shown that pinene oxide in the presence of even as weak an acid as distilled water at room temperature is converted to a mixture of products including sorbrerol, α-campholenealdehyde, carveol, etc., and it is known that in the presence of hot stronger acids, pinol, cymene and other conversion products result. It is further shown in application Ser. No. 376,997, filed August 27, 1953, now Patent No. 2,818,427, that 3-pinene-2-ol readily isomerizes to verbenol on mild acid treatment, even on boiling with as weak an acid as water, and it is further shown in copending application Ser. No. 368,210, filed July 15, 1953, now Patent No. 2,818,435, that verbenol itself is converted to monocyclic alcohols by acid treatments, again even with as weak an acid as water if such treatments are sufficiently severe. It is therefore clear that such treatments of oxidized pinene as ordinary steam distillation, or treatments of fractions of distillate as with sodium bisulfite for removal of carbonyl compounds, procedures followed in prior art, are entirely improper if such sensitive products as the pinene oxidation products mentioned are to be produced in attractive and economical yields and from easily separable pinene conversion mixtures not badly contaminated with secondary by-products. As a general rule, the simpler a mixture is, the more readily and more economically it may be separated into its constituents, and whereas some of the secondary by-products are valuable, it is of great advantage to separate their precursors from each other and then, if desired, convert such easily isolable primary individuals to the secondary products by means most suited to such individual conversions.

The problem of establishing satisfactory treatment procedures for terpene oxidation mixtures is by no means limited to pinene. Thus in copending application Ser. No. 377,000 filed August 27, 1953, it is shown that when limonene is oxidized with gaseous oxygen reagents and the oxidation product rich in peroxides is reduced by means of sodium sulfite or other suitable reducing agent and preferably under alkaline conditions, the reduction products can be separated to yield limonene-1,2-oxide, limonene-8,9-oxide, and cis- and trans-2,8-p-menthadiene-1-ols, all of which are acid-, even water-sensitive products are isolated or recognized by prior art as limonene oxidation products isolable from such peroxidized limonene. Only those much less sensitive products, carvone and carveol, were isolated and identified in prior art from this source.

Further in said copending application Ser. No. 377,000 it is shown that carvomenthene (1-p-menthene) oxidates when suitably processed by similar alkaline reductive methods yields carvomethene oxide and cis- and trans-forms of 2-methene-1-ol, which are acid sensitive, and carvotanacetol and carvotanacetone which are much less water-or acid-sensitive.

The problem of establishing satisfactory and economic procedures for treatment of various terpene oxidation mixtures suited to isolation of valuable but sensitive substances is therefore one which is very necessary of solution in order to achieve a broader utilization of terpenes and to achieve economic syntheses of a large group of oxygenated terpene compounds.

In general, it is convenient to prepare unsaturated terpene peroxides by contacting the trepenic material by any suitable method with air or other oxygen containing gas and at a temperature of 40° C. to 80° C., preferably around 50° C. to 60° C. at which temperature the oxidation is rapid and the peroxides are sufficiently stable that their decomposition is not too troublesome.

In processing terpene oxidation mixtures to recover valuable unstable compounds of the types described herein, it is necessary to decompose the peroxides carefully. The thermal decomposition of terpene peroxides is quite exothermic and while large batches may be decomposed safely if suitable precautions are taken, it is also convenient to conduct the decomposition on a continuous scale.

If the peroxides, usually in the presence of excess unreacted terpene, are heated, they tend to decompose at a rapid rate above 100° C., but more slowly at lower temperature, and water and acids form. As disclosed above, the water and acid cause the destruction of the epoxides and conversion of unstable allylomers, for example 3-pinene-2-ol, to the corresponding more stable allylomers, for example verbenol. In addition the relatively more stable normal or expected oxidation products, such as verbenol from pinene, can be converted more or less to a mixture of other products. Also simple thermal decomposition of the peroxides yields much non-volatile material of low value whether the decomposition is conducted under steam-distillation conditions or not.

We have found that the decomposition of the trepene peroxides can be conducted in the presence of alkali and thereby the unfavorable secondary reactions described above are avoided. Our treatment is readily accomplished by agitating an alkali or aqueous alkaline solution with the terpene peroxide during its decomposition and by thereby maintaining alkalinity as the peroxides decompose, the terpene oxides and other acid-sensitive compounds can be recovered as such. Thus high yields of a few oxidation products are obtained and little high boiling tar-like or non-volatile residues are obtained on fractionation of the treated product. The relatively simple mixture of oxidized terpenic products can be readily separated as pure materials, if desired, and these can then be converted to their acid isomerization products and other derivatives under the optimum conditions which exist for these specific conversions.

Our treatment by the process of the present invention is accomplished without the addition of reducing agents, part of the peroxides being reduced and a part of the peroxides being oxidized in the course of treatment. The reduced products are alcohols, ketones and oxides, whereas the oxidized products are acids, etc., partly keto acids. If our treatment is accomplished in the presence of aqueous alkali, such as caustic soda solution, the salts of the acids will be found in the aqueous layer, which, after separation of the oil phase, can be acidified to recover the free acids, most of which separate on acidification. Alternatively, if the acids are to be treated with reagents under alkaline conditions, as by hypochlorite for production of chloroform and polybasic acids, the aqueous salt solution can be treated directly after separating it from the terpenic oxidation layer without isolation of the acids.

The oil phase separated from the aqueous alkaline phase after the caustic treatment to convert the peroxides, is suitably processed as by fractional distillation to recover unreacted terpenic material and volatile neutral oxidized terpenic materials including oxides, alcohols and ketones.

The identity of the alkaline reagent is not of great importance, thus ammonia and alkyl amines as well as soda ash, caustic soda, hydrated lime, etc., are satisfactory in that they provide sufficient alkalinity to prevent acid conversion of the sensitive terpene during the decomposition of the peroxides if they are present in a sufficient excess to neutralize the acids formed and provide excess alkalinity. In general, however, we prefer to employ the cheaper alkalis such as caustic soda, lime, etc.

While the amount of alkali required can be estimated from experience or on theoretical grounds, we prefer to add a distinct, though relatively small, excess over that estimated as being sufficient to prevent acid catalyzed conversions because such an excess of alkali insures satisfactory decompositions and it is inexpensive. Even a large excess alkali is not harmful and if desired a strongly alkaline solution containing valuable quantities of alkali can be separated from the treated oil and contacted with fresh peroxidized terpenic material in order to consume such valuable alkali. Thus use of to little alkali to neutralize the acids formed and to provide adequate protection for the sensitive oxidation products is to be avoided, but excess alkali is harmless to the reaction and provides a convenient and inexpensive safety factor.

In conducting the process of our present invention, excess alkali is added to the peroxidized terpenic material in amount equal or preferably greater than that required to neutralize any slight acidity of the peroxidized material and to neutralize the terpenic acids produced on conversion of the peroxides. In the case of certain peroxides no heating is necessary and it is only required to contact the alkali with the peroxidized material until the peroxide value of the product is low, preferably 50 or below. The reaction is notably exothermic if the conversion is proceeding rapidly. Organic solvents such as alcohol may be employed but we find aqueous solutions of alkali usually satisfactory. Use of various solvent media may result in somewhat different ratios of tertiary alcohols to secondary alcohols, as for example, higher yields of 3-pinene-2-ol and lower yields of verbenol are obtained on conducting the conversion of pinene peroxides in alcoholic media, but the extra expense involved in use of non-aqueous media justifies their employment only in certain instances.

The time required for the conversion will depend on the terpenic peroxide being treated, the temperature, degree of agitation of the phases, if more than one is present, etc. In general, we prefer to conduct the destruction of the peroxides within a one to five hour processing time so that if tests of peroxide value show the mixture is decomposing too slowly, we can apply heat to the mixture to accelerate the rate of decomposition. Thus certain peroxides, such as those from 2-menthene, are much more stable in the presence of alkali than are those derived from limonene or the pinenes; and therefore, we heat 2-menthene peroxides and alkali solution, suitably to 80 to 100° C. in order to cause the conversion in a shorter time.

As soon as tests show that little peroxide remains in the organic layer, the reaction is considered over and the layers are separated and the organic layer is distilled to recover unoxidized terpenic material and the oxidation products. The aqueous layer may be reused if it contains valuable quantities of free alkali but is ordinarily acidified for recovery of acids or otherwise treated.

The process of the present invention represents a great improvement over the prior published procedures in that a relatively simple terpenic oxidation mixture is produced, and therefore separation of individual compounds including water- or acid-sensitive compounds is relatively easy and economical. Further, cheap reagents are employed to convert the initial unstable peroxidized terpenic material to a relatively stable oxidized terpenic mass suitable for fractionation or other types of separation. Further, terpenic acids are produced by our present process and can be recovered in pure form, if desired, or can be converted to dibasic terpenic acids.

It will be appreciated that broadly our invention consists of treating terpenic peroxides with an alkali, whereby a product is obtained that is suited to various recovery procedures for obtaining valuable products. Thus we have found that the mixture of monohydric alcohols so produced from terpenes and partially hydrogenated terpenes can be used for preparation of disinfectant preparations in flotation, in wetting composition, etc., i. e., in general wherever pine oil may be used. If such mixtures of alcohols are to be employed for such uses, then we can employ, if desired, as starting materials mixed terpenic products such as the various turpentines, commercial dipentene, and the like. For example, a turpentine containing beta-pinene, dipentene and alpha-pinene can be peroxidized to secure a product having a substantial peroxide value, say 500 to 2000, then this crude product can be treated with alkali until the peroxide value is substantially reduced, say to 50 or below, and the so treated organic layer then fractionated to recover a fraction rich in unchanged hydrocarbons, a fraction rich in monohydric terpene alcohols and a still residue. The fraction rich in terpene alcohols can satisfactorily be used as a replacement, in part or in whole, for pine oil for most purposes. Of course, on the other hand, each terpene yields individual oxidation products and if pure compounds are to be employed for further chemical processing, then in general it is best to start with a pure material for the peroxidation in order to minimize the difficulty of purifying the desired pure compounds.

It is, of course, unnecessary to choose the optical sign and magnitude of the optical rotation of the starting terpenic material if the rotation of the isolated oxidized derivative is a matter of no consequence. On the other hand, the present method is applicable to production of optically active products as shown in the examples.

Our process is generally applicable to terpenic materials containing at least one double bond and which yield peroxides. Certain terpenes do not yield peroxides readily or yield unstable or polymeric peroxides, i. e., gamma terpinene, camphene, α-terpinene and terpinolene are representatives of such unsuitable raw materials which do not yield quantities of peroxides when blown with air at 40 to 80° C. that are satisfactory for processing according to the present invention. However, we have found that α-pinene, β-pinene, limonene, carvomenthene, terpineol, terpineol ethers, nopol, dihydromyrcene, tetrahydromyrcene, tetrahydroalloocimene, 2-menthene and the like do yield oxidates containing substantial quantities of peroxides and from which can be isolated, by the process of the present invention, valuable known as well as hitherto unknown oxidation products suited to various applications including synthesis of essential oil ingredients. It will, of course, be appreciated that where the peroxides are formed, even though with difficulty, they can be decomposed in accordance with the procedure herein disclosed.

As illustrations of the type of compounds produced through employment of our process, we depict the overall reactions involved in the peroxidation and subsequent peroxide decomposition and which may occur at or near the unsaturated groups shown and which can occur irrespective of the presence in the entire molecule of other groups:

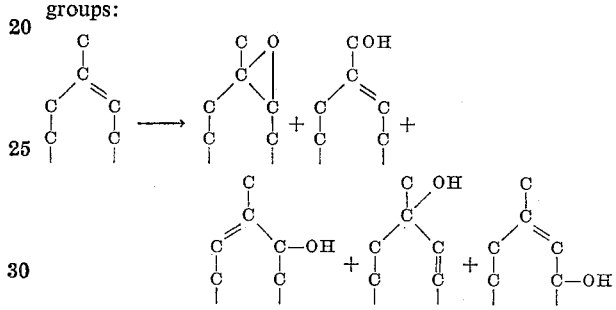

or

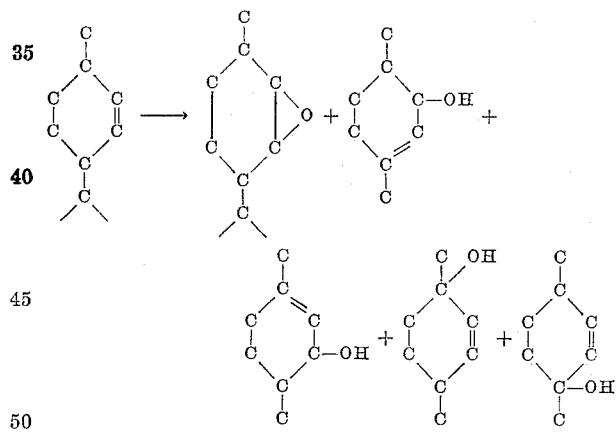

or

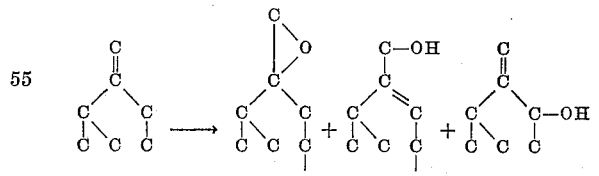

Ketones corresponding to the secondary alcohols shown above are also obtained, although ordinarily in smaller amounts provided that the peroxidized terpenic material was not oxidized excessively.

It is therefore evident that we secure in improved yields not only terpenic oxygen-bearing compounds known to the prior art but also compounds which are unknown to the prior art by any means of synthesis.

It is further evident that the process of the present invention makes possible the synthesis of compounds valuable for conversion to acyclic, bicyclic and monocyclic terpenoids of the types known to occur in essential oils as well as novel compounds hitherto unknown. Other novel improvements in the art of producing oxygenated terpenes will be evident to those skilled in the art by study of the examples.

During the decomposition of the terpenic peroxides under conditions whereby water- and acid-sensitive decomposition products, notably epoxides, are volatilized, the sensitive volatilized decomposition product is not protected by a fixed alkali which remains, of course, in the liquid decomposing mixture, but can advantageously be so protected by the presence of a volatile alkali. For example, if a mixture consisting of pinene, pinene peroxides and aqueous fixed alkali is heated and permitted to distill either with or without distillation induced by steam sparging, the condensate removed will consist of pinene, pinene oxide and other oxidation products, and water. As had been shown, water attacks pinene oxide and some conversion to sobrerol, etc. is to be expected in the condensate where both the oxide and water are present and intimately mixed. It is clear that the degree and importance of the attack will depend on the exact conditions that obtain during condensation, decantation, etc., depending on arrangement and operation of the equipment employed and the opportunities that exist for contact between oxide and water, the time and temperature of contact, etc. Such deleterious conversions of acid-sensitive compounds may take place as a result of steam distillation, cohobation or reflux during or after decomposition of peroxides. To prevent such undesirable attack of water on the sensitive compounds when operating under such conditions, we prefer to employ a volatile alkali such as ammonia or amines so that the condensate from such wet distillations or evaporations is itself alkaline. Under such conditions, we can employ a fixed alkali plus volatile alkali or volatile alkali only in the decomposition step. An important feature of our invention when employed with such wet distillation procedures is to keep both the reaction mixture and the condensate alkaline. These considerations apply irrespective of the type of peroxide decomposition being employed with respect to batch or continuous processing. Thus, for example, in continuous processing a feed stream of peroxidized terpene can be treated with a mixture of fixed and volatile alkali or volatile alkali alone and heated to insure loss of peroxide value, then the treated mixture can enter a fractionating zone of a distilling column whereby low boiling products, as excess unoxidized terpenic material alone or containing some of the lower boiling oxidized materials, are stripped off.

It is also known (see for example R. Dupont, Industrie Chimique Belge 11, 3–13 (1940)) to oxidize terpenic materials to secure products which we regard as secondary conversion products. For example, limonene has been oxidized with oxygen until about a mole of oxygen was absorbed per mole of limonene present, and it was found that the gas phase then contained 19% $CO_2$, 6.0% CO and 42.5% hydrogen, thus indicating the complex type of conversion involved and the decomposition, even carbon-carbon cleavage, of the initial oxidation products. Also water was said to be formed. Upon fractionation 25 grams of residue boiling above 140° C. at 2 mm. was collected from 100 grams of limonene. From the crude volatile products, carveol was identified in the fraction of B. P. 100–107° C. at 12 mm.; and from fractions boiling at 120 to 140° C. at 2 mm. there could be isolated trans-8-menthene-1,2 diol. No other products were identified. It will be appreciated that such prior art oxidation procedures yield difficulty separable mixtures which we seek to avoid, first of all by peroxidizing the terpenic material to a product economically rich in peroxidation products but not to the point that substantial decomposition sets in. Thus we prefer to discontinue the proxidation when the peroxide value reaches, say 1000 to 2000 more or less, and when it becomes evident that although further oxidation, as measured by oxygen consumption, is taking place, the peroxide value is not increasing proportionally to the oxygen absorbed; thus indicating that the rate of decomposition of the peroxides is tending to balance further peroxide formation and/or that the oxygen being consumed is not producing the desired peroxides. Recovery of unreacted terpenic material is easy, and therefore it is economic and desirable to oxidize it only partially and recover unreacted material for further processing in a new oxidation. As a second important feature of overall procedure, we then treat with alkali so that as the peroxides decompose, the acids and water resulting from the decomposition are prevented from attacking the sensitive products produced in the decomposition. Thereby we substantially avoid hydration of the epoxides, allylomerization of the allylomer possessing a tertiary hydroxyl group, and avoid substantial formation of secondary oxidation and acid-conversion products which otherwise would be formed and complicate separation procedures and result in greater loss as non-volatile products.

An economic process for producing and recovering oxygenated terpenic materials is particularly desirable in that such products possess more varied used and/or greater values than the corresponding hydrocarbons from which they may originate. Thus carvone, carveol and carvyl esters can be prepared from 1,8-p-menthadiene. These are present in spearmint oil and are useful in replacing or extending supplies of this natural oil. As shown in copending application Ser. No. 359,962, filed June 5, 1953, verbenone, which is known to result from air oxidation of pinene, can be converted to thymol, menthols, piperitone, pulegone and like valuable materials, whereas verbenol, also known to result from working up air oxidation products of α-pinene, is shown in copending application Ser. No. 348,825, filed April 14, 1953, to be convertible to citral, piperitone, menthols, etc., which have known and established utility. Also it is known that myrtenol can be produced on working up oxidation products of β-pinene, and as shown by copending application Ser. No. 361,419, filed June 12, 1953, now Patent No. 2,821,547, this compound can be converted to the perilla oil group of compounds. Further, the various alcohols and ketones and their mixtures derivable from working up terpenic oxidation products possess good solvent power for gums and resins, good wetting and germicidal power when used as replacement for pine oil in various compositions and are useful for pharmaceutical and odorant purposes.

The following examples are illustrative of the invention.

EXAMPLE 1

α-Pinene was blown with air at about 60° C. until it possessed a peroxide number of about 1500 corresponding to about 12.5% of pinene hydroperoxide. A pure terpene hydroperoxide has a theoretical peroxide value of about 12,000, see G. S. Fisher and L. A. Goldblatt, Ind. and Eng. Chemistry 43, 671 (1951). The peroxide value was determined by shaking a 1 cc. sample of the peroxidized pinene in 50 cc. of a chloroform-acetic acid mixture with 5 cc. saturated aqueous potassium iodide for two minutes, adding 100 cc. water and titrating the liberated iodine with N/10 sodium thiosulfate.

$$\text{Peroxide value} = \frac{\text{cc. thiosulfate}}{\text{wt. sample in grams}} \times N \times 100$$

where $N$=normality of the thiosulfate.

EXAMPLE 2

A 3780 gram portion of the above air oxidized α-pinene was stirred and heated to a maximum temperature of 90° C. wtih 500 cc. of 10% aqueous caustic soda solution for four hours, forty-five minutes. The peroxide value was then 93 and the reaction was stopped. The aqueous phase was still strongly alkaline but gave a negative test for peroxide. The oil phase, 3703 grams, was fractionated to remove unreacted pinene at about 100 mm., and the pressure was then reduced to 10 mm. for fractionation of the pinene oxidation products. Infrared analysis of the fractions employing the infrared data presented in copending application Ser. No. 352,291, filed April 30, 1953, and employing as optical standards the pure compounds prepared using the procedures of that invention showed the following compounds to be present and in the quantities indicated. The percent values refer to the composition of the total oxygenated distillate.

| | Percent |
|---|---|
| α-Pinene oxide | 25.7 |
| 3-pinene-2-ol | [1] 24.5 |
| Verbenol | 31.6 |
| Verbenone | 7.9 |
| α-Camphonene aldehyde | 0.4 |
| Myrtenol | 2.2 |
| Not identified | 7.7 |

[1] Cis and trans, total.

The distillation residue amounted to 2.82% of the weight of the crude peroxidized pinene of peroxide value 1500 whereas recovered pinene amounted to 70.5% and total fractions of oxygenated distillate were 21.99%. The remainder chiefly represented loss of weight during the decomposition step including the formation of the terpenic acids. Acidification of the alkaline layer yielded the terpenic acids.

EXAMPLE 3

3000 grams of the oxidized α-pinene was stirred and heated to 90–95° with 300 grams of 100% aqueous sodium carbonate. The peroxide number fell slowly and in 23 hours, was down to 139. The oil layer at this point amounted to 2910 grams, and the aqueous layer to 340 grams. The oil layer was then warmed with 100 cc. of saturated sodium sulfite to further reduce the peroxide value (to 94). The oil was then fractionated by first stripping off unreacted α-pinene at 100 mm. and then at 10 mm. to recover various fractions enriched in oxygenated products to determine its composition with the results shown in Table 1. Acidification of the carbonate layer liberated organic acids. These were separated roughly into two fractions. One fraction was a very weak organic solid acid with an equivalent weight of 358 by titration, evidently a resin-type acid containing neutral impurities. The other fraction was obtained as an impure viscous syrup. It was a strong organic acid and titrated as a monobasic acid equivalent weight 202. On treatment with sodium hypochlorite, it yielded chloroform. These properties indicates the presence of monobasic keto acid containing the group $CH_3CO$. This fraction also probably contains neutral impurities, so that the true equivalent weight of the acid(s) is somewhat lower.

EXAMPLE 4

3000 grams of the above air-oxidized α-pinene was stirred and refluxed with 300 grams of 10% aqueous sodium carbonate plus 10 grams of ethylene diamine. The primary purpose of the ethylene diamine is to provide protecting alkalinity for the condensate until it has returned to mingle with sodium carbonate solution. The carbonate, being non-volatile, cannot provide this protection to compounds such as pinene oxide which are easily attacked by water. The amine also probably raises the alkalinity of the oil layer, with which it is miscible, above the level which could be attained with sodium carbonate, and this affects the results of the decomposition in a desirable manner. The peroxide value was reduced to 184 in 12 hours, 68 in 19 hours and 26 in 26 hours. The oil layer, washed with fresh sodium carbonate solution, weighed 2932 grams. The final aqueous layer weighed 365 grams. The oil layer was fractionated for determination of the products formed, the results being shown in Table 1. As in Example 3, organic acids were recovered from the aqueous layer on acidification.

EXAMPLE 5

2635 grams of the above air-oxidized α-pinene was mixed with a solution of 40 grams sodium hydroxide in 300 grams methanol. The mixture was homogeneous. The temperature of the mixture rose rapidly without external heating and the mixture refluxed vigorously for a few minutes in spite of applied external cooling. The maximum pot temperature was 78° C. The mixture became 2 phase during the decomposition. Stirring was continued until the temperature dropped to 70° C., when a sample of the top phase was withdrawn. It showed a peroxide number of 30. Stirring was continued a few more minutes until the temperature dropped to 65° C. The peroxide number was then down to 18. The aqueous layer was still alkaline. Water was added to wash out methanol, the layers separated, the washed oil layer was once more washed with dilute sodium carbonate solution and after separation it was fractionally distilled with the results shown in Table 1. The crude oil layer, after washing, weighed 2445 grams. Acidification of the aqueous layer yielded a precipitate of syrupy organic acid, as with the carbonate decompositions of Examples 3 and 4.

Table 1

[Oxygenated products recovered as percent of oxygenated distillate. Shown in parentheses ( ) are percent of product recovered based on weight of crude air-oxidized pinene of peroxide value about 1500.]

| Oxidation Product | Example 3 | Example 4 | Example 5 |
|---|---|---|---|
| α-Pinene oxide | 28.4 (6.40) | 30.3 (7.0) | 28.4 (5.7) |
| 3-pinene-2-ol | 10.8 (2.45) | 17.1 (3.9) | 28.4 (5.7) |
| Verbenol | 20.5 (4.62) | 31.4 (7.2) | 29.1 (6.0) |
| Verbenone | 13.0 (2.93) | 11.3 (2.6) | trace |
| Myrtenol | | 3.9 (0.9) | 2.5 (0.5) |
| Myrtenal | | 1.7 (0.4) | |
| Not identified | 27.3 (6.15) | 4.3 (1.0) | 11.6 (2.2) |
| Distillation residue | (5.43) | (4.53) | (1.63) |
| Recovered α-pinene | (62.60) | (68.50) | (66.70) |
| Total | 100.0 (90.58) | 100.0 (96.03) | 100.0 (88.43) |

EXAMPLE 6 d-Limonene was blown with air at about 45° for 5 days at which time it showed a peroxide number of 1725. Portions of this peroxidized product were subjected to various treatments.

*Treatment "A."*—To 1760 grams of the peroxidized limonene was added a solution of 31 grams sodium hydroxide dissolved in 231 grams methanol at such a rate that the temperature could be maintained at 70° C. with cooling. The peroxide value at the end of the alkali addition was 200 and after agitating for 2 hours longer the peroxide value was 165. Addition of 8 grams more sodium hydroxide dissolved in 60 grams methanol and agitating for one hour longer brought the peroxide value to 9. Water was added and the oil was washed with water, then the oil was dried and fractionated to first recover unreacted limonene at 100 mm. and then fraction of the oxidation products at 10 mm. The oxidation products were identical with those obtained by alkaline reduction of peroxidized limonene, see copending application Ser. No. 377,000. The yields of these products as produced by means of alkali decompositions are reported here on the basis of 1000 grams of the peroxidized limonene:

| Product: | Yield in grams |
|---|---|
| Limonene-1,2-monoxide | 30.3 |
| Limonene-8,9-monoxide | 6.3 |
| 2,8-p-menthadiene-1-ol | [1] 39.5 |
| Carvone | 7.5 |
| Carveol | [1] 47.5 |
| Undetermined | 33.5 |
| Higher boiling products | 66.5 |

[1] Cis and trans.

From the aqueous alcoholic alkaline solution resulting from the decomposition of the peroxides, there was obtained 18.7 grams of organic acids by acidification and extraction of the solution.

*Treatment "B."*—To 1555 grams of the air-oxidized limonene there was added 10 cc. ethylene diamine and 60 grams sodium hydroxide dissolved in 200 cc. of water and the mixture was agitated. Despite some cooling the temperature rose to 102° C. and remained there for 15 minutes. The temperature then dropped to 80° C. in 20 minutes and this temperature was maintained for one hour by heating the mixture with a heat lamp. The peroxide value of a sample removed and water washed was 8. After washing, the oil layer was fractionated in vacuo to remove unreacted limonene and then to collect fractions enriched in the various oxidation products. Yields of these are reported in grams based on 1000 grams of the air-oxidized limonene.

|  | Grams |
|---|---|
| Limonene-1,2-oxide | 41.3 |
| Limonene-8,9-oxide | 5.5 |
| 2,8-p-methadiene-1-ol | 45.2 |
| Carvone | 14.2 |
| Carveol | 52.1 |
| Undetermined | 43.0 |
| Higher boiling products | 69.5 |

From the aqueous alkaline solution separated from the treated organic layer, 43 grams of organic acids were isolated on acidification with sulfuric acid.

Example 7

The methyl ether of α-terpineol was peroxidized to a peroxide value of 900 by passing oxygen through it at 60° C. and in the presence of infrared light. Upon treating 1000 grams of the peroxidized material with a suspension of 50 grams of lime and 200 cc. water and heating the mixture to 100° C. for three hours, there was obtained a product of peroxide value about 5 which was separated from the aqueous phase and fractionated to recover a mixture consisting primarily of alcohols and some ketones, as shown by infrared analysis of the fractions which boiled over the range 103 to 145° C. at 10 mm. pressure and weighed 107 grams. Absorption bands characteristic of epoxides were present in fractions boiling over the range of 90–103° at 10 mm.

Example 8

Carvomenthene was converted to a peroxidized material, peroxide value about 1600 by blowing air through it for several days in the presence of ultraviolet light and at a temperature of about 55 to 65° C. A sample of this, 1500 cc., was treated with 500 cc. of 20% potassium hydroxide solution and warmed to 90° C. for four hours. The aqueous layer was separated and acidified to obtain 18 grams of organic acids. The organic layer was treated with water to remove all but a trace of alkali, then fractionated at 10 mm. Infrared examination of the fractions boiling within the range 75° to 108° C. showed that there was present carvomenthene oxide, the α and B forms of 2-menthene-1-ol, carvotavacetone and carvotanacetol, the same compounds as result from alkaline sulfite reduction of peroxidized carvomenthene, see copending application Serial No. 377,000.

Example 9

β-Pinene was peroxidized as carvomenthene was in Example 8 and the peroxidized product was worked up as the carvomenthene oxidation products were. Fractions boiling at 90° C. at 10 mm. were rich in pinocarveol and those boiling at about 103–105° C. at 10 mm. were almost pure myrtenol. An acid product could be isolated by acidifying the aqueous alkaline treating solutions. Infrared bands characteristic of epoxides were found to be present in fractions boiling over the range 60–70° C. at 10 mm., thus indicating the presence of β-pinene epoxide.

Example 10

A product resulting from the fractionation of sulfate turpentine, B. P. 93 to 111° at 100 mm. and containing about 31% α-pinene, 47% β-pinene, and 12% dipentene, remainder unidentified, was peroxidized by blowing it with air for about two weeks at about 25 to 40° C. and to a peroxide value of about 1400. It was treated with sufficient 10% caustic soda at about 50 to 70° C. to lower its peroxide value to 41 at the end of 3 hours treatment. On fractionation of this product at 20 mm. there was obtained about 71% recovered terpenes, 4% of a fraction boiling at about 69 to 81° C. at 20 mm. and rich in epoxides and 11% of a fraction boiling at 81 to 123° C. at 20 mm. rich in alcohols and containing some carbonyl material. This fraction could be readily emulsified with soap and water to provide a composition similar to emulsified pine oil. It was also an excellent solvent for resins soluble in higher alcohols.

Example 11

α-Terpineol, $\alpha_D^{25}+1°$, $n_D^{25}$ 1.4765, containing 15–20% of dihydro-α-terpineol was air-oxidized by bubbling air through it using a fritted glass pencil. At 50–55° C., the mixture reached a peroxide number of 286 in 119 hours. The temperature of the terpineol was then raised to 60 to 65° C., and the oxidation continued for an additional 191 hours when the final peroxide number was 1405, $n_D^{25}$ 1.4803.

A mixture of 1975 grams of the final oxidate and 500 cc. of 10% sodium hydroxide were stirred for 4 hours without any external heating. The temperature rose from 25° C. to 45° C. in 20 minutes and then remained between 45–49° C. for the 4 hours. The mixture was then heated to 90° C. in one hour and the reaction continued for 2½ hours. At the end of this time the peroxide number was 8. The layers were separated and the oil layer washed with a mixed solution of sodium carbonate and sodium bicarbonate. The oil layer was then distilled. The sodium hydroxide layer was acidified with concentrated hydrochloric acid, liberating considerable carbon dioxide and about 20 grams of organic acids.

The oil from reduction of the peroxides was fractionated through an efficient column packed with glass helices. The absolute pressure was maintained at 10 mm. to recover the unreacted α-terpineol and dihydro-α-terpineol (1500 grams of the mixture). The dihydro-α-terpineol was recovered almost completely showing that it was not attacked appreciably during the oxidation. The residue which contained the reaction products was stripped at 1 mm. leaving a 15 gram reaction residue. The stripped material was fractionated through a smaller column of the same type described above. During the distillation, which was conducted at 1.2–3 mm. absolute pressure to a final pot temperature of 220° C., seventeen fractions were collected and these ranged in size from 12 to 46 grams. Infrared spectra were made for many of the fractions and these indicated the number of major compounds as well as their structure. The compounds were identified by comparison of their infrared spectra with the infrared spectra of known compounds whose proof of structure is presented in copending Ser. No. 377,000. Spectra and distillation data showed the following compounds to be present in the order of their increasing boiling points (°C.):

(A) α-8-hydroxycarvomenthene monoxide, 90–93°/3 mm.
(B) β-8-hydroxycarvomenthene monoxide, 101–103°/2.4 mm.
(C) Trans-2-menthene-1,8-diol, 106°/1.4 mm.
(D) Cis-2-menthene-1,8-diol, 110°/1.4 mm.
(E) Sobrerol, 120°/1.2 mm.
(F) 8-hydroxycarvotanacetone, 120°/1.2 mm.

Many of the fractions containing sobrerol had a camphoraceous odor reminiscent of pinol. The pinol probably arose from the spontaneous dehydration of cis-sobrerol at elevated temperatures.

A portion of the fractionation residue was refluxed with 25% sulfuric acid to yield primarily pinol, indicating that the residue was principally sobrerol.

A summary of the infrared spectral data and distillation data showed that the following approximate percentages of various materials were present in the crude reaction product. (The percentages are expressed relative to the total residual material after removal of the terpineols):

|  | Percent |
|---|---|
| α-8-hydroxycarvomenthene monoxide | 10.8 |
| β-8-hydroxycarvomenthene monoxide | 13.0 |
| Trans-2-menthene-1,8-diol | 15.6 |
| Cis-2-menthene-1,8-diol | 10.5 |
| Sobrerol | 40.7 |
| 8-hydroxycarvotanacetone | 5.4 |
| Residue (from stripping) | 4.0 |
| Total | 100.0 |

EXAMPLE 12

Optically inactive 2-menthene, about 40% cis and 60% trans, was air blown using a fritted glass pencil to disperse the air. At 50–55° C., the mixture reached a peroxide number, Wheeler; C. A., 26,3128, of 1385 in 164⅓ hours. The long oxidation period was required by the fact that portions of fresh hydrocarbon were added during the first 120 hours of air blowing. The final oxidation mixture, 4192 grams, and 700 cc. of sodium hydroxide solution were heated with stirring at 80–86° C. for 3 hours. A qualitative test showed that very little of the peroxides had been destroyed, so a concentrated caustic solution containing 70 grams of sodium hydroxide was added to the mixture. The reaction was then continued at 80–101° C. 10½ hours to a final peroxide number of 45. The layers were separated and the oil phase washed with a saturated sodium bicarbonate solution. The final oil layer was then distilled.

The unreacted 2-menthene, 3427 grams, was first removed at 100 mm. absolute pressure, through an efficient Stedman-type column operated at a low reflux ratio. The residue, which was composed of the oxidation products, was stripped at 1 mm. absolute pressure to remove it from an 18 gram reaction residue. The volatile stripped oxidation products were then fractionated through an efficient column packed with stainless steel protruded packing. The fractionation was conducted at 10 mm., to a pot temperature of 175° C., and then the pressure was reduced to 1 mm. and the fraction continued to a final pot temperature of 220° C. Twenty-two fractions were collected and these ranged in size from 14 to 27 grams. Infrared spectra were made for all of the fractions and these indicated the number of major compounds, as well as their structure. This spectrophotometric data showed the following compounds to be present in the order of their increasing boiling points at 10 mm. The compounds were identified by comparison of their spectrum with the spectra of known compounds—see copending application Ser. No. 402,413, filed January 5, 1954.

A. p-Cymene, B. P. ca. 60° C.
B. 2-menthene epoxide, B. P. 68–72° C. (probably both cis and trans forms)
C. 2-menthene-4-ol, B. P. 81–85° C. (probably both cis and trans forms)
D. α-2-menthene-1-ol, B. P. 85–89° C.
E. β-2-menthene-1-ol, B. P. 90–93° C.
F. α-3-menthene-2-ol, a carvenol, B. P. 95–97° C.
G. β-3-menthene-2-ol, B. P. 98–101° C.
H. Trans-piperitol, B. P. 100–102° C.
I. Carvenone, B. P. 101–102° C.
K. Unidentified material, B. P. 102–102.5° C.

A summary of the fractionation and infrared spectral data showed the crude oxidate, after removal of the unreacted 2-menthene, to have the following approximate composition:

|  | Percent |
|---|---|
| Cymene | 1.7 |
| 2-menthene epoxide | [1] 4.2 |
| 2-menthene-4-ol | [1] 3.0 |
| α-2-menthene-1-ol | 17.5 |
| β-2-menthene-1-ol | 15.2 |
| α-3-menthene-2-ol | 9.6 |
| β-3-menthene-2-ol | 16.2 |
| Trans-piperitol | 5.3 |
| Carvenone | 16.9 |
| Unidentified | 1.1 |
| Non-volatile residues | 9.3 |
| Total | 100.0 |

[1] Total cis and trans forms.

The alkaline layer from the peroxide decomposition was acidified with concentrated hydrochloric acid. The organic acids thus liberated were taken up in methylene chloride. The resulting extract was washed once with water and then concentrated to remove the solvent, yielding 45 grams of crude organic acids.

EXAMPLE 13

Tetrahydroallocimene was produced by hydrogenating alloocimene with a platinum oxide catalyst and fractionating the product to obtain a fraction of B. P. 98° C. at 100 mm., sp. g. 0.745 at 15.5° C. When 1500 grams of this material was peroxidized to a peroxide value of 1300 and treated with alkali as was the tetrahydromyrcene, a product was obtained which on fractionation at 10 mm. yielded unreacted hydrocarbon and about 210 grams of pleasant smelling oxidation products boiling over the range 75 to 143° C. at 20 mm. Infrared examination of fractions of this product showed absorptions characteristic of epoxides, secondary alcohols, tertiary alcohols and ketone. At least some of the oxidation products obtained were identical with those obtained from tetrahydromyrcene.

Tetrahydromyrcene, produced by selectively hydrogenating myrcene with a nickel catalyst was blown with air until it showed a peroxide value of about 600. When three liters of this peroxidized product was agitated with sixty grams of aqueous 10% ammonia and 300 cc. of a 10% solution of aqueous sodium hydroxide for two days at about 35 to 45° C., the product showed a peroxide value of 30. After separation from the aqueous phase the organic layer was distilled at about 10 mm. pressure to recover tetrahydromyrcene and oxidation products of pleasant flowery odor. Infrared spectra of the fractions showed the presence of an epoxide and two or more alcohols, as well as some carbonyl compounds. The fractions of oxidation products boiled over the range 75 to 118° C. at 10 mm. and are valuable as odorants.

EXAMPLE 14

Myrcene was hydrogenated with a commercial nickel-in-oil catalyst at 40 to 60 p. s. i. and 85° to 100° C. so that one mole of hydrogen was absorbed per mole of myrcene. The product was fractionated to isolate dihydromyrcene, B. P. about 100° at 100 mm. Infrared spectra of the consecutive fractions showed the material boiling in that range consisted of about 90% of

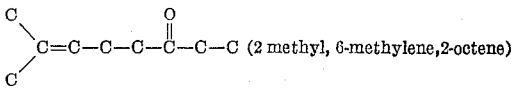 (2 methyl, 6-methylene,2-octene)

and about 10% of

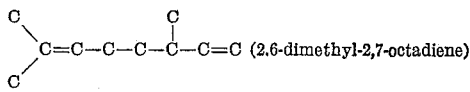 (2,6-dimethyl-2,7-octadiene)

the latter exhibiting a slightly lower boiling point than the former. Peroxidation of fractions containing various proportions of these compounds was conducted by passing air through them to give products of peroxide value 500 to 800. These peroxidized products were converted by heating them with excess sodium hydroxide and then fractionation of the so-treated product yielded fractions rich in epoxides, various secondary and tertiary alcohols and small quantities of ketones. A trace of primary alcohol was also present. Such fractions of the oxidation products possessed pleasant perfume odors and could be hydrogenated to saturated alcohols also possessing pleasant characteristic and flowery odors.

EXAMPLE 15

3000 g. of oxidized α-pinene produced as in Example 1 was charged into a 5-liter flask fitted with a stirrer, thermometer and dropping funnel and provided with a cooling bath. 1000 g. of 20% sodium hydroxide solution was added slowly, holding the temperature at 30° C. by cooling. Small additions of the alkali caused considerable evolution of heat at the beginning of the reaction. After part of the alkali had been added, the remainder could be added faster, since the evolution of heat was not as great. Alkali was added as rapidly as cooling permitted, and a total of about two hours was required to complete the alkali addition. The mixture was then allowed to stir and samples were withdrawn for peroxide measurement from time to time.

The following table shows the fall in peroxide value with time. "0" time coincides with the beginning of alkali addition.

| Time in hours: | Peroxide No. |
| --- | --- |
| 0 | 1500 |
| 4 | 300 |
| 6 | 230 |
| 10 | 150 |
| 17 | 55 Stopped |

At the end of the 17 hours of treating time, the alkali layer was separated and the oil layer (2835 g.) was fractionated to separate unreacted pinene, pinene oxide, 3-pinene-2-ol, verbenol, and traces of other products derived from pinene oxidation.

From the foregoing examples it can readily be seen that oxygenated compounds are readily obtainable from terpenes and their partially hydrogenated derivatives, respectively, in substantial yields by a relatively simple procedure and without the use of expensive reagents.

The concentration of the alkaline material which is added to the peroxidized terpenic material can vary over a rather wide range, though, in general, we prefer to use alkali whose concentration is such that the salts which are produced during the decomposition will remain completely in solution. This, with some alkalies at high concentrations, there is formed a sludge of the less soluble salts. However, the decomposition can be conducted with, say, 50% caustic soda solution, and if salts do separate, then water can be added after the decomposition until these salts are dissolved. Concentrated alkali, such as a saturated potassium hydroxide solution, is capable of giving rapid and clean decomposition of the terpenic peroxides, probably because a portion of the caustic dissolves in the terpenic peroxide-alcohol-terpenic material, thus bringing about very intimate contact of the alkali and the peroxide. Whether salts of the terpenic acids separate as a solid or semi-solid phase will depend, of course, upon the concentration of alkali, whether excess alkali is present and how much, upon the identity of the alkali, etc.

As used herein, the term "terpenic material" means a compound possessing a skeleton of 10 carbon atoms and made up of two isoprene units, and simple derivatives thereof, and compounds derivable therefrom by addition reactions.

In the foregoing description, all temperatures are given in degrees centigrade.

Having described the invention, what is claimed is:

1. The process for treating a mixture of oxidation products rich in hydroperoxides, which mixture is formed by the oxidation of an unsaturated terpenic material with gaseous oxygen which consists essentially in decomposing the peroxides in such a mixture by treating the mixture with a non-reducing alkaline material in an amount sufficient to maintain alkaline conditions throughout the treatment until the peroxides present are substantially decomposed.

2. The process for treating a gaseous oxygen oxidation mixture of an unsaturated terpenic material selected from the class consisting of (1) a mono-unsaturated compound possessing the carbon-carbon system of pinane in which the double bond involves the number 2 carbon atom, (2) an unsaturated p-menthane derivative possessing a double bond involving the number 2 atom as the sole carbon-carbon double bond involving a nuclear carbon atom, (3) a partially hydrogenated myrcene and (4) a partially hydrogenated alloocimene, which oxidation mixture is rich in epoxides and peroxides and is formed by the oxidation of such unsaturated terpenic material with gaseous oxygen, which consists essentially in decomposing the peroxides in such a mixture by treating the mixture with a non-reducing alkaline material in an amount sufficient to maintain alkaline conditions throughout the treatment until the peroxides present are substantially decomposed.

3. The process of claim 2 in which the oxidation mixture is an oxidation mixture of a substance containing the carbon structure of pinane.

4. The process of claim 2 in which the oxidation mixture is an oxidation mixture of a pinene.

5. The process of claim 4 in which the pinene is α-pinene.

6. The process of claim 2 in which the oxidation mixture is an oxidation mixture of an unsaturated p-menthane derivative possessing a double bond involving the number 2 carbon atom as the sole carbon-carbon double bond involving a nuclear carbon atom.

7. The process of claim 6 in which the nuclear double bond of the p-menthane derivative involves the 1 and 2 carbon atoms.

8. The process of claim 6 in which the unsaturated p-menthane derivative is a hydrocarbon.

9. The process of claim 6 in which the unsaturated p-menthane derivative possesses a single double bond.

10. The process of claim 6 in which the unsaturated p-menthane derivative possesses a single double bond which is in the 1–2 position.

11. The process of claim 6 in which the unsaturated p-menthane derivative is limonene.

12. The process of claim 6 in which the unsaturated p-menthane derivative is carvomenthene.

13. The process of claim 6 in which the unsaturated p-menthane derivative possesses a single double bond which is in the 1–2 position and which derivative also possesses an oxygenated substituent bonded through a single oxygen atom to the number 8 carbon atom.

14. The process of claim 6 in which the unsaturated p-menthane derivative is α-terpineol.

15. The process of claim 6 in which the unsaturated p-menthane derivative is 2-p-menthene.

16. The process of claim 3 in which the substance containing the carbon structure of pinane is β-pinene.

17. The process of claim 2 in which the oxidation mixture is an oxidation mixture of a partially hydrogenated aliphatic terpene, said terpene having the empirical formula $C_{10}H_{16}$.

18. The process of claim 17 in which the partially hydrogenated terpene is a tetrahydroterpene.

19. The process of claim 17 in which the partially hydrogenated terpene is a partially hydrogenated alloocimene.

20. The process of claim 17 in which the partially hydrogenated terpene is tetrahydroalloocimene.

21. The process of claim 17 in which the partially hydrogenated terpene is a dihydroterpene.

22. The process of claim 17 in which the partially hydrogenated terpene is the dihydroalloocimene.

23. The process of claim 17 in which the partially hydrogenated terpene is a partially hydrogenated myrcene.

24. The process of claim 17 in which the partially hydrogenated terpene is tetrahydromyrcene.

25. The process of claim 17 in which the partially hydrogenated terpene is dihydromyrcene.

26. The process of claim 1 in which the alkaline material comprises a volatile alkaline material.

27. The process which comprises the steps of (1) treating the gaseous oxygen oxidation mixture of an unsaturated terpenic material rich in epoxides and peroxides by a procedure consisting essentially of treating said mixture with a non-reducing alkaline material in an amount sufficient to maintain alkaline conditions throughout the treatment until the peroxides present are substantially decomposed and (2) then separating any remaining alkaline material and salts of acidic products from the remaining products, whereby there is produced a neutral fraction rich in oxygenated terpenes.

28. The process of claim 27 in which the neutral material is fractionally distilled to recover therefrom individual fractions enriched in oxygenated terpene derivatives.

29. The process which comprises oxidizing a terpenic material selected from the class consisting of (1) a mono-unsaturated compound possessing the carbon-carbon structure of pinane in which the double bond involves the number 2 carbon atom, (2) an unsaturated p-menthane derivative possessing a double bond involving the number 2 carbon atom as the sole double bond involving a nuclear carbon atom and (3) a partially hydrogenated aliphatic terpene, said terpene having the formula $C_{10}H_{16}$, with an elemental oxygen-containing gas under substantially anhydrous conditions until a substantial peroxide value is reached, decomposing the peroxides in the thus-formed oxidation mixture by treatment of the mixture with a non-reducing alkaline material in an amount sufficient to maintain alkaline conditions throughout the treatment until the peroxides present are substantially decomposed and then separating any remaining alkaline material and acidic material from the remaining products resulting from the alkaline treatment, whereby there is produced a neutral portion rich in oxygen-containing terpene derivatives.

References Cited in the file of this patent

UNITED STATES PATENTS

| | | |
|---|---|---|
| 2,052,195 | Schneider | Aug. 25, 1936 |
| 2,302,467 | Palmer | Nov. 17, 1942 |
| 2,376,369 | Lister | May 22, 1945 |
| 2,392,413 | Rummelsburg | Jan. 8, 1946 |
| 2,484,841 | Lorand | Oct. 18, 1949 |
| 2,522,678 | Kozacik | Sept. 19, 1950 |
| 2,632,774 | Conner | Mar. 24, 1953 |

OTHER REFERENCES

Farmer et al.: J. Chem. Soc., vol. #1942, pages 121–139 (page 135 in particular).